United States Patent [19]
Fritz

[11] Patent Number: 5,327,413
[45] Date of Patent: Jul. 5, 1994

[54] RUGGEDIZED HOMOGENEOUS THIN DIELECTRIC FILM FOCUS SENSOR

[75] Inventor: Bernard S. Fritz, Eagan, Minn.

[73] Assignee: Honeywell, Minneapolis, Minn.

[21] Appl. No.: 955,331

[22] Filed: Oct. 1, 1992

[51] Int. Cl.[5] ............................................. G11B 7/135
[52] U.S. Cl. ................................. 369/112; 369/44.11; 369/44.23; 250/201.5
[58] Field of Search ............... 369/44.23, 44.21, 44.22, 369/44.14, 44.11, 43, 44.37, 120, 112; 250/201.5

[56] References Cited

U.S. PATENT DOCUMENTS

| | | | |
|---|---|---|---|
| 5,200,946 | 4/1993 | Fritz | 369/112 |
| 5,245,174 | 9/1993 | Prikryl et al. | 250/201.5 |

OTHER PUBLICATIONS

"Principles of Optical Disk System" by G. Bouwhuis et al. from Philips Research Laboratories, Eindhoven and published by Adam Hilger, Ltd., Bristol and Boston, p. 80.

"A Focus Sensing Method with Improved Pattern Noise Rejection", by D. R. Marshall of the Hewlett Packard Disk Mechanisms Division as published in the S.P.I.E. vol. 1449, Optical Data Storage, 1991 pp. 332–339.

"Frustated Total Internal Reflection and Application of Its Principle to Laser Cavity Design" by Iann Court and Frederick K. von Willisen in the issue of Applied Optics, Jun. 1964, vol. 3, No. 6, pp. 7191 ∝ 726.

"A Variable Transmittance Beam Splitter" by R. N. Smartt, in the Apr. 1970 issue, vol. 9, No. 4, Applied Optics, pp. 970–971.

"Principles of Optics" by Born and Wolf, 5th ED, Section 1.6, pp. 61–67.

"Principles of Optics" by Born and Wolf, 5th ED 1975, pp. 60–67.

Primary Examiner—Paul M. Dzierzynski
Assistant Examiner—Don Wong
Attorney, Agent, or Firm—Charles J. Ungemach

[57] ABSTRACT

A focus detecting device utilizing thin film to detect convergence or divergence of rays from a light source by directing the light rays through a pair of prisms having the same index of refraction but separated from one another along a surface by material having a lesser index of refraction so that both reflection and transmission occur across the surface, the reflection being detected by the first pair of detectors and the transmitted radiation being detected by a second pair of detectors whose outputs will vary in accordance with the collimation of the light.

7 Claims, 3 Drawing Sheets

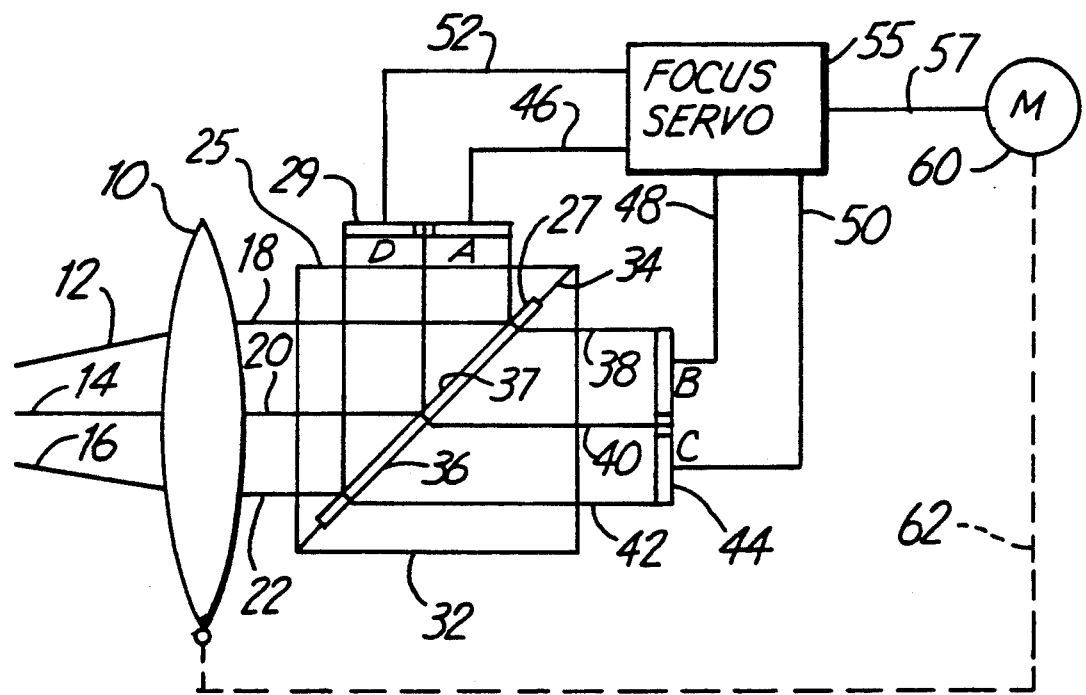
*Fig. 1A*
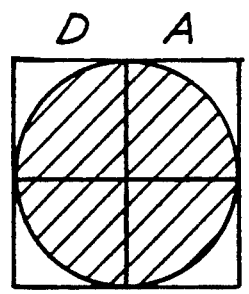 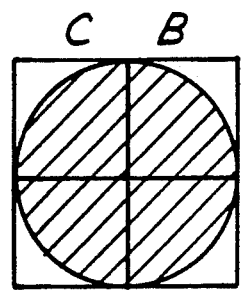
*Fig. 1B*   *Fig. 1C*

RUGGEDIZED HOMOGENEOUS THIN DIELECTRIC FILM FOCUS SENSOR

BACKGROUND OF THE INVENTION

The present invention relates to focus sensing and more particularly to a focus sensor for use with equipment where the exact distance between two devices is to be maintained, as for example, in a microscope or a optical recorder such as that disclosed in my co-pending application entitled MAGNETO-OPTIC REWRITTABLE OPTICAL HEAD, Ser. No. 07/771,042, filed Oct. 2, 1991, now U.S. Pat. No. 5,200,946 and assigned to the assignee of the present invention.

A method of determining whether light is collimated or is converging or diverging has been suggested and referred to as the "critical" angle method which is discussed on page 80 of a book entitled Principles of Optical Disc Systems by G. Bouwhuis et al. of Philips Research Laboratories, Eindhoven and published by Adam Hilger, Ltd., Bristol and Boston. More particularly, when a parallel beam of light passes through a prism of a first index of refraction and is incident at an angled surface just above the critical angle, the light is reflected. Two detectors may then be placed so that the radiation received by both detectors will be equal. If the incident beam is converging then a first portion of the beam will strike the surface below the critical angle and will not be reflected. This light will pass out of the prism but the light that is reflected from the remaining portion of the beam will strike one detector more than the other thus indicating convergence. Similarly, if the light is diverging, the other of the detectors will receive more energy than the first. By measuring the energy received by the detectors it may be determined whether the original beam was parallel, converging or diverging. This method has been suggested for use in focus sensing as shown by an article entitled "A Focus Sensing Method with Improved Pattern Noise Rejection" by D.R. Marshall of the Hewlett Packard Disk Mechanisms Division and published in the S.P.I.E. Volume 1499, Optical Data Storage, '91 on pages 332-339. In this technique light reflected from the surface is only parallel when the surface is at a first position (i.e. focused) and is either divergent or convergent on either side of the focus position. By sensing the output of two detectors in the "critical angle" method, the position of the pick up lens, which receives energy from the disk, can be maintained to assure proper focus.

A basic problem occurs with the focus sensing apparatus heretofore proposed in that the sensitivity of the system to even very slight angular changes of the medium through which the light passes can significantly alter the output. Likewise, even minor changes in the index of refraction which can occur as, for example, with changes in temperature or even changes in altitude make such systems extremely difficult to employ except in very controlled environments.

The present invention utilizes an effect associated with a thin homogeneous dielectric films such as described in the book "Principles of Optics" by Born and Wolf 5th ED Section 1.6 pp 61-67. According to this phenomena, light which passed through a homogeneous dielectric thin film situated between two homogeneous media will have a certain percentage reflected by the film and the rest transmitted through the film, assuming a no-losses non-absorbing film. The ratio of transmitted to reflected light at the film varies with incident angle, film thickness, optic index's of the film and surrounding media and the wavelength of the incident light.

One finds that for a thin film whose thickness is on the order of the wavelength of light used, with lower optic index than the surrounding media and with light incident nominally at the critical angle of the surrounding media/thin film, that the percentage of reflected light is highly sensitive to changes in the incident angle. Variations of reflection and transmission are described in an article entitles "A Variable Transmittance Beam Splitter" by R.N. Smartt, in the April 1970 issue of Applied Optics on pages 970-971.

SUMMARY OF THE INVENTION

I have discovered that the application of these principles to the focus control of such devices as optical recorders, results in a focus control system which is simple, rugged and does not have the problems relating to minor changes in index of refraction or slight changes in incidence angle. More particularly, I place two prisms having the same index of refraction next to each other with the boundary between them including a thin film or preferably small volume of air, and I direct the light reflected from the recording disk through a pick up lens (which if properly position will collimate the light) to the two prisms so that the light is reflected and transmitted from and through the substantially totally internally reflecting surface to first and second detector pairs. The light will be received by both detectors in each pair equally if it is collimated by the lens. If the light coming from the pick up lens is divergent, one of each of the two detectors in each pair will receive more light while the other receives less and vice versa if the light is divergent. The outputs of all four detectors are then used to detect the collimation of the light from the pick up lens and this information can be used as a focus detector or as a control for the proper positioning of the lens at the proper focus position. Since the indices of refraction of the two prisms are the same, changes in index will not have a serious effect nor will small changes in angle of incidence because, as will be explained, I use the sum and difference of detector outputs to provide my focus error signal.

BRIEF DESCRIPTION OF THE DRAWINGS

FIG. 1A is a schematic diagram of one embodiment of the present invention wherein the light from the pick up lens is collimated.

FIGS. 1B and 1C show the energy received by the detectors in the arrangement of FIG. 1A.

DETAILED DESCRIPTION OF THE PREFERRED EMBODIMENTS

Figure 2A:
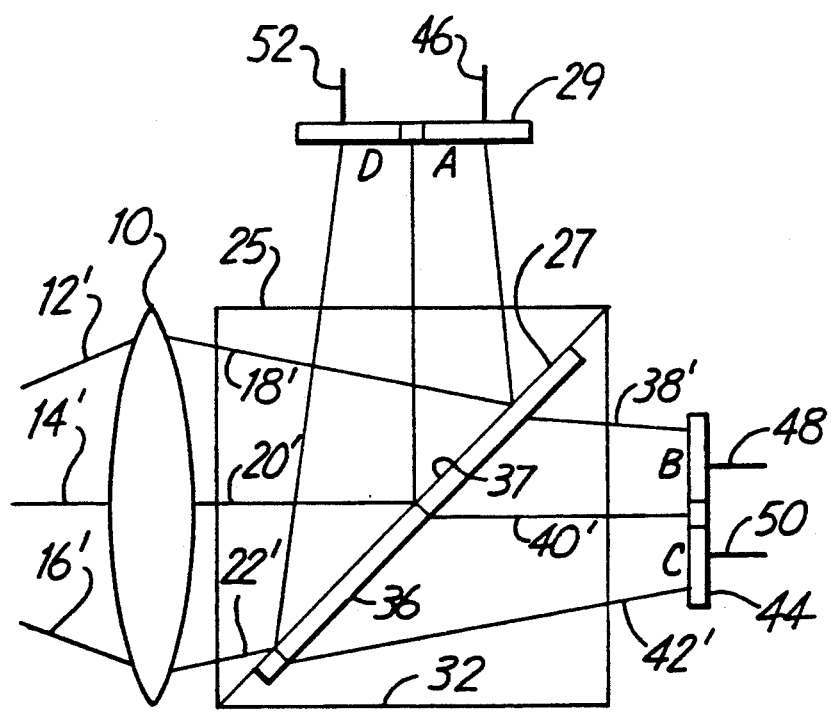
FIG. 2A is a schematic diagram similar to FIG. 1A wherein the light from the pick up lens are convergent.

FIG. 1A shows a lens 10 receiving light reflected from a source (not shown) along lines such as 12, 14 and 16. If the source is at the focal distance of lens 10, then the lens 10 will collimate the light so that it emerges therefrom along parallel lines such as shown by reference numerals 18, 20 and 22, respectively. This collimated light is shown entering a first prism 25 which has a first index of refraction and a surface 27 which is positioned at an angle shown to be approximately 45 degrees with respect to the rays 18, 20 and 22. While the angle is seen at about 45 degrees, for convenience, it must be substantially at the critical angle (i.e., the angle of incidence above which total internal reflection occurs). As seen in FIG. 1A, light striking surface 27 is reflected upwards out of prism 25 to a pair of detectors A and D which may be formed from a split detector 29 such as the four sector detector described in my above-mentioned co-pending application Ser. No. 07/771,042. Two halves of this quad detector, D and A in FIG. 1A are also seen in FIG. 1B where it is seen that both halves receive substantially the same amount of light.

A second prism 32 with the same index of refraction as prism 25, is shown in FIG. 1A being joined to prism 25 at a peripheral area 34. Prism 32 has a second surface 36 which is close to, but separated from surface 27 in the central region by film or a layer of air 37 which has a lower index of refraction than the prisms 25 and 32. Accordingly, when the rays 18, 20 and 22 strike the central region at an angle of incidence substantially equal to the critical angle, energy is not only reflected but is transmitted through this region along lines such as shown in reference numerals 38, 40 and 42 to a second pair of detectors, B and C, which again may be quad detectors like those described in the above co-pending application Ser. No. 07/771,042. When the rays 18, 20 and 22 are collimated, then the energy striking detectors B and C will also be equal and is seen in FIG. 1C.

If the outputs of detectors A, B, C and D are analyzed according to the equation: $FE=(A+C)-(B+D)$ where FE is the focus error of lens 10, then FE is equal to zero when the light from lens 10 is collimated. The electrical outputs of detectors A, B, C and D are shown on lines 46, 48, 50 and 52, respectively in FIG. 1A and these signals are presented to a focus servo 55 which operates to sum the signals in accordance with the above equation to produce an output on a line 57 indicative of the focus error FE. This signal is presented to a motive means such as servo motor 60 which operates through a mechanism shown as dashed line 62 to position the pick up lens 10 in accordance with any error signal on line 57. In the arrangement show on FIG. 1A, the focus error signal given by the equation above will be, as indicated, zero and accordingly motive means 60 will not operate to move lens 10.

Figure 2B:
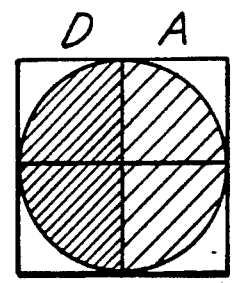
FIG. 2B and 2C show the energy received by the detectors in the arrangement of FIG. 2A.
Figure 2C:
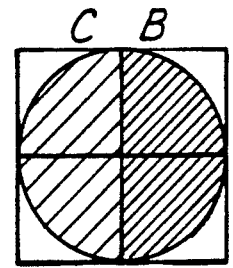

If the object that is emitting light moves closer to the lens 10 than it was in FIG. 1A, the situation may be as shown is FIG. 2A where light is now travelling from the object along lines such as shown by reference numerals 12', 14' and 16'. The light from pick up lens 10 will no longer be collimated but will now converge along lines shown by reference numerals 18', 20' and 22'. These lines again enter prism 25 but now with somewhat different results. The rays in the upper portion of FIG. 2A following lines such as 18' now strike the surface 27 at a smaller angle of incidence than was the case in FIG. 1A and more energy will be transmitted and less energy will be reflected in this region. Thus, the amount of energy received by detector A will be less and that received by detector B will be more than was the case in connection with FIG. 1A. Rays in the lower portion of FIG. 2A, however, now strike the surface 27 at an angle of incidence somewhat greater than in FIG. 1A and more energy will be reflected and less transmitted in this region. As a result, detector D will receive a greater amount of reflected energy while detector C will receive less than was the case in connection this FIG. 1A. This is shown in FIGS. 2B and 2C wherein detectors D and B now receive greater energy than detectors A and C.

The signals from detectors A, B, C and D along lines 46, 48, 50 and 52 will again be presented to the focus-servo of FIG. 1A and the above equation $(A+C)-(B+D)$ will result in FE being a negative quantity since $(A+C)$ will be less than $(B+D)$. The focus-servo 55 of FIG. 1 will therefore produce a signal on line 57 indicating that the lens 10 must be moved to the left in order for the rays 18', 20' and 22' to become collimated again.

Figure 3A:
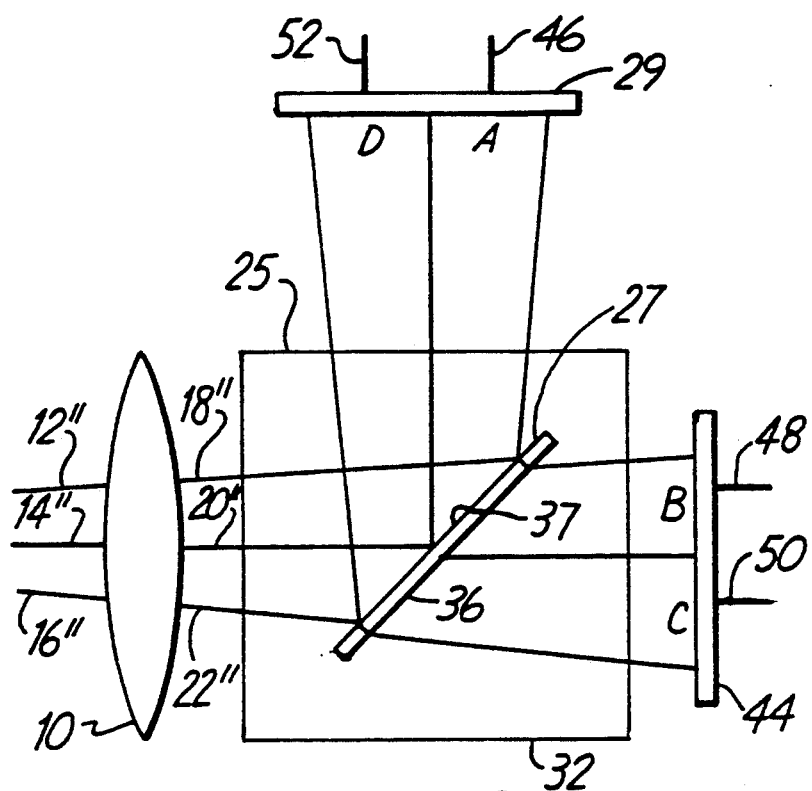
FIG. 3A is a schematic diagram similar to FIG. 1A wherein the light from the pick lens is divergent.
Figure 3B:
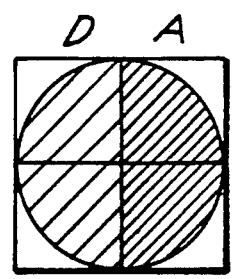
FIGS. 3B and 3C show energy received by the detectors in the arrangement of FIG. 3A.
Figure 3C:
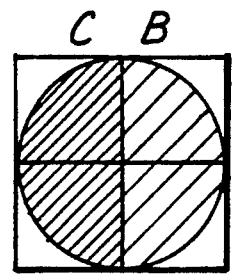

On the other hand, if lens 10 were to be farther to the object emitting light than was the case in FIG. 1A then light to lens 10 would be like that shown in FIG. 3A coming from the object along lines such as shown in 12", 14" and 16". These lines would emerge from lens 10 divergently along lines such as shown by reference numeral 18", 20" and 22". The upper portion of these rays strike the surface 27 at a greater angle of incidence than was the case in FIG. 1A while those in the lower portion strike the surface at a lesser angle of incidence than was the case in FIG. 1A. The upper portion of the light travelling through lens 10 will be more reflected and less transmitted than was the case in FIG. 1A while the light in the lower portion of the beam from lens 10 will now be more transmitted and less reflected than was the case in FIG. 1A. The result is that detectors A and C will now receive more energy while detectors B and D will receive less energy as seen in FIGS. 3B and 3C. In this case FE in the above equation will be positive since the sum of $A+C$ will be greater than the sum of $B+D$. The signals on lines 46, 48, 50 and 52 when presented to focus-servo 55 of FIG. 1A will result in a positive signal on output line 57 so that motor 60 of FIG. 1 will now drive lens 10 to a position farther to the object to restore the collimated light condition representing proper focus.

It is thus seen that the principle set forth in FIGS. 1, 2 and 3 provide a system which can detect the focus position and maintain the same in a very accurate and precise manner. It will be noted that the slight changes in angle of incidence, which can occur from, for example, rotations of prisms 25 and 32, will have no effect on the resulting equation $(A+C)-(B+D)$ so that the system is not subject to the problem encountered in the prior art. Furthermore, since two prisms 25 and 32 are used, both of which have the same index of refraction, any changes of temperature or other environmental changes that effect the index of refraction will effect both prisms the same and the apparatus will continue in spite of the change index of refraction thus again eliminating another of the major problems of the prior art.

Figure 4:
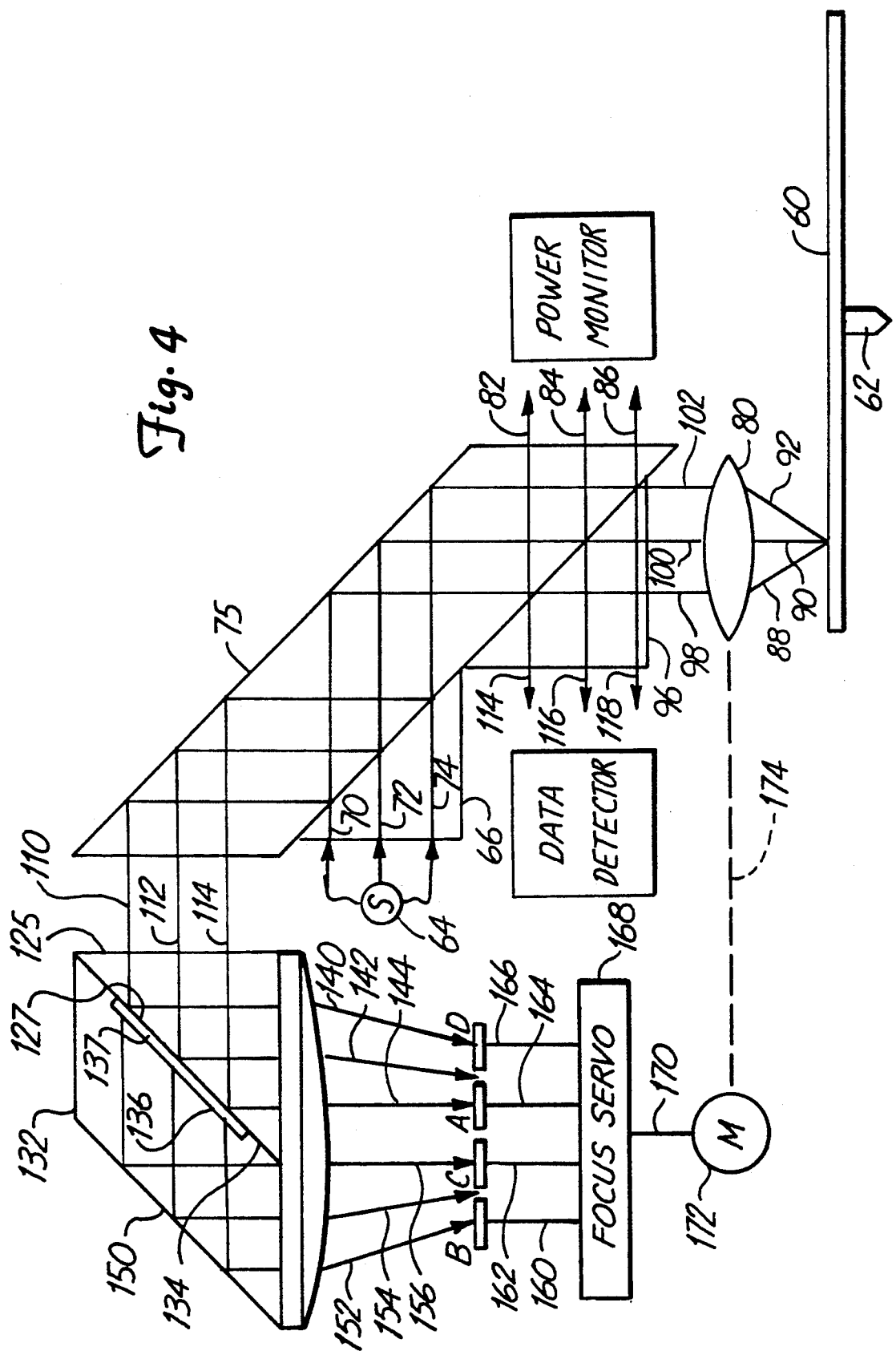
FIG. 4 is a schematic diagram of the present invention used with an optical recording head.

FIG. 4 shows the present invention utilized in a magneto-optic recording system such shown in the above referred to co-pending application Ser. No. 07/771,042. More particularly a recording disk 60, mounted for rotation on a shaft 62, is shown receiving energy from a source 64 which produces a polarized light beam through a prism 66 over lines such as shown by reference numeral, 70, 72 and 74 passing into a rhomboid prism 75 and being reflected downwardly to the pick up lens 80 to be focused onto the recording disk 60. As described in the above co-pending application Ser. No. 07/771,042 some of the light passes out of the system along lines shown by arrows 82, 84 and 86 to a power monitor (not shown) that can adjust the intensity of the radiation of source 64. Light reflected off of the recording disk 60 passes back to the lens 80 along lines such as shown as reference numerals 88, 90 and 92 and, if pickup lens 80 is at the proper focus position, emerges collimated and passes back into a prism 96 along parallel lines having reference numerals 98, 100, 102. This radiation passes back into the rhomboid prism 75 where it is reflected off the inner surfaces thereof and finally passes out of the rhomboid prism 75 along lines such as shown by reference numeral 110, 112 and 114 at the upper end thereof. Again, some of the energy is transmitted out of prism 96 to the bottom left in FIG. 4 along lines such as shown by arrows 114, 116 and 118 to a utilization device such as a computer (not shown).

If lens 80 is in the proper focus position then the energy from the top of the rhombic prism 75 along lines 110, 112 and 114 will be collimated. These rays enter into a prism 125, having a first index of refraction, and are reflected off a surface 127 which is positioned at about the critical angle with respect to collimated rays 110, 112 and 114. As was the case in connection with FIG. 1, a second prism 132 also having the same index of refraction, is peripherally joined to prism 125 at areas such as shown by reference numeral 134. A second surface 136 is close to but separated from surface 127 by a centrally located air gap 137. Reflection and transmission will occur and some of the energy will be reflected downwardly along lines such as 140, 142 and 144 to a first detector pair A and D in a manner similar to that shown in connection with FIG. 1A, while a portion of the energy from the surface 127 will be transmitted through the air gap 137 and through prism 132 to be reflected off an angular totally internally reflective surface 150 downwardly along lines such as shown by reference numerals 152, 154 and 156 to a pair of detectors B and C. In the same manner as was discussed in connection with FIGS. 1A, 2A and 3A, if lens 80 is at the proper focus position, detectors A and D will receive equal radiation as will detectors B and C. If lens 80 is closer to the surface of disk 60 than is seen in FIG. 4 then the rays emerging from the rhombic prism 75 along lines 110, 112 and 114 will be divergent with the result that detectors C and A will receive more energy while detectors D and B will receive less energy as was the case in connection with FIG. 2. Similarly, if lens 80 is further away from surface 60 than is the case shown in FIG. 4 then the rays 110, 112 and 114 will be convergent with the result that detectors D and B will received more energy than detectors C and A as was the case in connection with FIG. 3. Thus, the electrical outputs from detectors A, B, C and D along lines shown by reference numeral 160, 162, 164 and 166 will be received by a focus-servo 168 and the same equation $FE=(A+B)-(B+D)$ will be used to produce an output on line 170 to a motive means 172. Motive means 172 will drive lens 80 by mechanical connection shown as dashed line 174 in accordance with the sign of the output on line 170. More particularly, if the 110, 112 and 114 are convergent, indicating that lens 80 is to far from the disk 60, the output on line 170 will be negative since $A+C$ will be less than $B+D$. On the other hand, if the rays 110, 112 and 114 are divergent indicating that lens 80 is to close to surface 60 then the output on line 170 will be positive since $A+C$ will be greater than $B+D$.

Thus lens 80 will be repositioned to be at the focal position at which point the energy along lines 110, 112 and 114 will be collimated and there will no output on line 170 so that motive means 172 is de-energized.

It is thus seen that I have provided a system useful to automatically focus a lens with respect to a radiation transmitting object in a manner which minimizes the problems of the prior art relative to changes in index of refraction and sensitivity to rotation.

Although the present invention has been described with reference to preferred embodiments, workers skilled in the art will recognize that changes may be made in form and detail without departing from the spirit and scope of the invention.

What is claimed is:

1. Focus detecting apparatus comprising:
    a source of light for producing a polarized beam;
    beam splitter means receiving the polarized beam and transmitting a part thereof to a first reflecting surface for reflection back to the beam splitter means to produce first and second beam portions, the first beam portion being reflected for use by a power monitor and the second portion being transmitted through lens means to a recording medium, the recording medium reflecting light back through the lens means, the lens means operable to collimate the reflected light from the recording medium when the recording medium is located a first distance from the lens means, the lens means transmitting the reflected light to the beam splitter means to produce third and fourth beam portions, the third beam portion being reflected for use by a data detector and the fourth portion being reflected in a first path;
    first means having a first index of refraction positioned in the first path to receive light in the fourth portion from the beam splitter means, said first means having a first surface positioned at a first angle with respect to light in the fourth portion received from the lens means;
    second means having the first index of refraction to receive the light passing through the first surface and having a second surface parallel to but displaced from the first surface by a medium having a second index of refraction, the first and second means being positioned so that the incidence angle at the first surface provides substantially total internal reflection;
    first and second detector means for receiving the light reflected from the first surface and producing first and second outputs in accordance therewith, said first and second detector means for receiving substantially the same amount of light when light from the lens means is collimated but different amounts of light when not collimated;
    third and fourth detector means for receiving the light transmitted through the first and second surfaces and producing third and fourth outputs in accordance therewith, the third and fourth detector means receiving substantially the same amount of light when light from the lens means is collimated but different amounts of light when not collimated; and
    signal receiving means connected to the first, second, third and fourth detectors to receive the first, second, third and fourth outputs to provide a resultant output indicative of the receipt of light in different amounts by the first and second detectors and by the third and fourth detectors as an indication that the object is at other than the predetermined distance from the lens means.

2. Apparatus according to claim 1 wherein the resultant output is a function of the sum of the first and third outputs less the sum of the second and fourth outputs.

3. Apparatus according to claim 2 wherein the lens means causes the light from the object to converge when the object is further than the first distance and the light to diverge when the object is closer than the first distance and the resultant output has a first characteristic when the light is convergent and a second characteristic when the light is divergent.

4. Apparatus according to claim 3 further including motive means connected to the signal receiving means and operable to move the lens means in a first direction when receiving a resultant signal of the first characteristic and in a second direction when receiving a resultant signal of the second characteristic.

5. Apparatus according to claim 4 wherein the motion of the lens means in the first and second direction causes the lens means to be positioned to collimate light from the object.

6. Apparatus according to claim 1 wherein the recording medium is a magneto-optical recording medium.

7. Apparatus according to claim 6 wherein the light reflected from the magneto-optic recording medium is for reading data recorded on the recording medium.

* * * * *